Aug. 29, 1961 R. C. CURTIS 2,998,483

SELF-CORRECTING PULSE-CODE COMMUNICATION RECEIVING SYSTEM

Original Filed March 30, 1953

2 Sheets-Sheet 1

United States Patent Office 2,998,483

Patented Aug. 29, 1961

2,998,483

SELF-CORRECTING PULSE-CODE COMMUNICATION RECEIVING SYSTEM

Richard C. Curtis, deceased, late of Old Westbury, N.Y., by Margaret O. Curtis, executrix, Old Westbury, N.Y., assignor to Hazeltine Research, Inc., Chicago, Ill., a corporation of Illinois Original application Mar. 30, 1953, Ser. No. 345,563, now Patent No. 2,862,054, dated Nov. 25, 1958. Divided and this application Feb. 17, 1958, Ser. No. 715,829

19 Claims. (Cl. 178—23)

GENERAL

This invention relates to pulse-code-communication systems and, more particularly, to self-correcting pulse-code-communication systems. The invention is especially useful in connection with automatic-telegraph equipment and, accordingly, will be described in that environment.

This application is a division of application Serial No. 345,563, filed March 30, 1953, now Patent No. 2,862,054, granted Nov. 25, 1958, and entitled "Self-Correcting Pulse-Code-Communication System." Reference is made to said patent for description of codes and transmitting systems which may be used in conjunction with the present receiving systems. Reference in this application to FIGS. 1–3, inclusive, refer to the drawings included in the parent patent.

One previously known type of automatic-telegraph equipment utilizes a manually operated automatic-telegraph sender which develops electrical binary-permutation-code message-pulse groups representative of discrete message symbols. In another type of automatic-telegraph equipment, message pulses are developed in the form of holes punched in a tape which may be utilized later with suitable tape-responsive equipment to develop electrical binary-permutation-code pulses representative of the punched holes and thus of the message symbols.

The electrical binary-permutation-code message pulses developed by either type of equipment may be applied as modulation information to a conventional radio-frequency transmitter for developing radio-frequency pulses in accordance therewith for transmission to suitable receiving equipment which responds to the transmitted pulses for reproducing the discrete message symbols. During the transmission of these pulses from the transmitter to the receiving equipment, noise disturbances, caused for example by atmospheric conditions, may distort the transmitted pulses by, for example, canceling a transmitted pulse or adding a pulse in a space between pulses. Such distortions of transmitted pulse groups cause error in the reproduction of the discrete message symbols represented by the pulse groups.

One type of automatic-telegraph equipment heretofore proposed utilizes a minimum of a 7½ digit code to represent each message symbol and corresponding synchronizing information. More particularly, 5 digits represent the message symbol and each group of 5 digits is preceded by a start-synchronizing digit and followed by a stop-synchronizing pulse of at least 1½ digits' duration. In such a system, it is possible to transmit a maximum of 25 or 32 message-digit pulse permutations individually to represent discrete message symbols. By "message symbols" is meant, for example, letters of the alphabet, numbers, and miscellaneous control symbols for operating the printer of the receiving equipment. A typical digital element duration for such a system is about 22 milliseconds and a normal maximum operating speed is about 60 5-letter words per minute.

It has been found that a high percentage of the errors occurring in automatic-telegraph equipment of the type just described occurs as the result of not more than one error every 37½ digits. In other words, this error rate, which may be considered as a maximum rate, corresponds to a rate of one error for every 5 message symbols or letters. If the symbols are transmitted in 5-letter groups, as in privacy or secrecy communication systems, the maximum error rate corresponds to one error each 5-letter group or word. Accordingly, by correcting errors in each 5-letter group whenever the error is the result of distortion of one of the 25 message digits representative of letters of that group, a high percentage of the errors in the reproduction of message symbols is eliminated.

It is an object of the present invention, therefore, to provide a new and improved self-correcting pulse-code-communication system for translating a signal representing message-code pulses representative of discrete message symbols and for reproducing the symbols subject to reduced error.

It is another object of the invention to provide a new and improved error-correcting pulse-code-receiving system for receiving a signal representing message-code pulses representative of discrete message symbols and check-code pulses for checking the signal for signal-translation error and for reproducing the symbols subject to reduced error.

It is another object of the invention to provide a new and improved self-correcting pulse-code-communication system for translating a signal representing binary-permutation-code pulses representative of discrete message symbols and binary-permutation-code check pulses for checking the signal for signal-translation error and for reproducing the symbols subject to reduced error.

It is still another object of the invention to provide a new and improved self-correcting pulse-code communication system for translating a signal representing message-code pulses representative, in 5-digit groups, of discrete message symbols and for reproducing the symbols subject to reduced signal-translation error.

It is another object of the invention to provide a new and improved self-correcting pulse-code-communication system for translating a signal representing message-code pulses representative of discrete message symbols and check-code pulses for checking a plurality of message-code pulse groups for a maximum of one signal-translation error and for reproducing the message symbols subject to reduced error.

It is still another object of the invention to provide a new and improved self-correcting pulse-code-communication system for translating a signal representing message-code pulse groups individually representative of discrete message symbols and a minimum number of check-code pulses for checking a predetermined plurality of message-code pulse groups for signal-translation error and for reproducing the symbols subject to reduced error.

It is still another object of the invention to provide a new and improved self-correcting pulse-code-communication system for translating a signal representing message-code pulse groups individually representative of discrete message symbols and check-code pulses of the same number of digits as a message-code pulse group for checking the signal for signal-translation error and for reproducing the message symbols subject to reduced error.

It is another object of the invention to provide a new and improved self-correcting pulse-code-communication system for translating a signal representing message-code pulses representative of discrete message symbols and for reproducing the symbols subject to reduced error and one capable of operating in conjunction with conventional automatic-telegraph sending and printing equipment.

It is another object of the invention to provide a new and improved self-correcting pulse-code-communication system for translating a signal representing message-code pulses representative of discrete message symbols and synchronized in pulse groups representative of a plurality of such symbols and for reproducing the symbols subject to reduced error.

It is another object of the invention to provide a new and improved self-correcting pulse-code-communication system for translating a signal representing message-code pulses representative of discrete message symbols and for reproducing the symbols subject to reduced error and utilizing for synchronizing groups of the message pulses a plural-digit synchronizing signal which is capable of effecting synchronization notwithstanding one digital error therein.

In accordance with the invention, an error-correcting pulse-code-receiving system for receiving a signal representing message-code pulses representative of discrete message symbols and check-code pulses for checking the signal for signal-translation error and for reproducing the symbols subject to reduced error comprises code-pulse-supply circuit means for supplying the aforesaid message-code pulses and check-code pulses. The pulse-code-receiving system also includes pulse-storage means coupled to the supply circuit means for storing a predetermined plurality of plural-digit message-code pulse groups individually representative of the aforesaid symbols and a check-code pulse group uniquely representative of predetermined digital relations in the aforesaid plurality of message-code groups. The pulse-code-receiving system also includes error-correcting circuit means responsive jointly to the stored message-code and check-code groups for correcting error in the message-code group and pulse-decoding means responsive to the corrected message-code groups for reproducing the aforesaid symbols.

Also in accordance with the invention, an error-correcting pulse-code-receiving system for receiving a signal representing message-code pulses representative of discrete message symbols and check-code pulses for checking the signal for signal-translation error and for reproducing the symbols subject to reduced error comprises code-pulse-supply circuit means for supplying the message-code pulses and the check-code pulses, the system also including error-correcting circuit means responsive jointly to a predetermined plurality of 5-digit message-code pulse groups individually representative of the aforesaid symbols and a 5-digit check-code pulse group uniquely representative of predetermined digital relations in the aforesaid plurality of message-code groups for correcting error in said message-code groups and pulse-decoding means responsive to the corrected message-code groups for reproducing said symbols.

For a better understanding of the present invention, together with other and further objects thereof, reference is had to the following drawings, and its scope will be pointed out in the appended claims.

Figure 1:
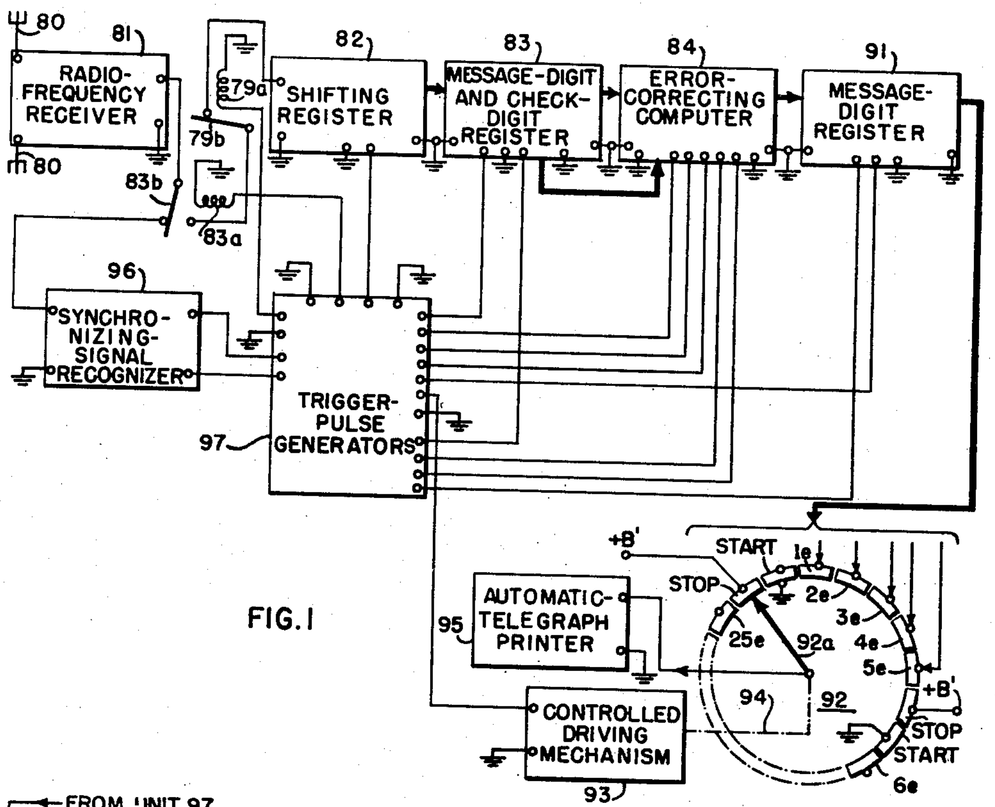
FIG. 1 is a circuit diagram, partly schematic, of a pulse-code-receiving system constructed in accordance with the invention.

*Description of FIG. 1 Pulse-code-receiving system*

Referring to FIG. 1 of the drawings, there is represented a pulse-code-receiving system constructed in accordance with the invention. The pulse-code-receiving system comprises a code-pulse-supply circuit for supplying message-code pulses and check-code pulses. The code-pulses-supply circuit preferably comprises a receiver antenna 80, 80 and a radio-frequency receiver 81 of, for example, the frequency-shift modulation type and of conventional construction coupled thereto.

The receiving system also includes first pulse-storage means coupled to the supply circuit comprising the radio-frequency receiver 81 for storing a predetermined plurality of message-code pulse groups and the check-code pulse group transmitted therewith. The pulse-storage means preferably comprises pulse-triggered circuit units for storing 5-digit message-code pulse groups individually representative of the message symbols and one check-code pulse group uniquely representative of predetermined digital relations in 5 such message-code groups. More particularly, the pulse-storage means comprises, for example, a shifting register 82 which may be generally similar in construction to the shifting register 51 of the FIG. 1 (of the parent patent) transmitting system but includes 30 pulse-triggered storage units individually having two operating conditions, one representing a stored pulse and the other representing the absence of a stored pulse. The radio-frequency receiver 81 is coupled to the input circuit of the shifting register 82 through a relay contact **83*b* and a normally closed relay contact 79*b*** in a manner more fully described hereinafter.

The 30 storage units of the shifting register 82 are individually connected to 30 storage units of a message-digit and check-digit register 83 which preferably is also included in the first pulse-storage means and may be of similar construction to the message-digit and check-digit register 54 of the FIG. 1 (of the parent patent) transmitting system for storing 5 message-code pulse groups of 5 digits each and a check-code pulse group of 5 digits.

The pulse-code-receiving system also includes error-correcting circuit means responsive jointly to the stored message-code and check-code groups for correcting error in the message-code groups. The error-correcting circuit means comprises an error-correcting computer 84, preferably responsive jointly to predetermined digital combinations of the message-code and check-code groups for deriving the odd-even pulse-sum values thereof.

Figure 2:
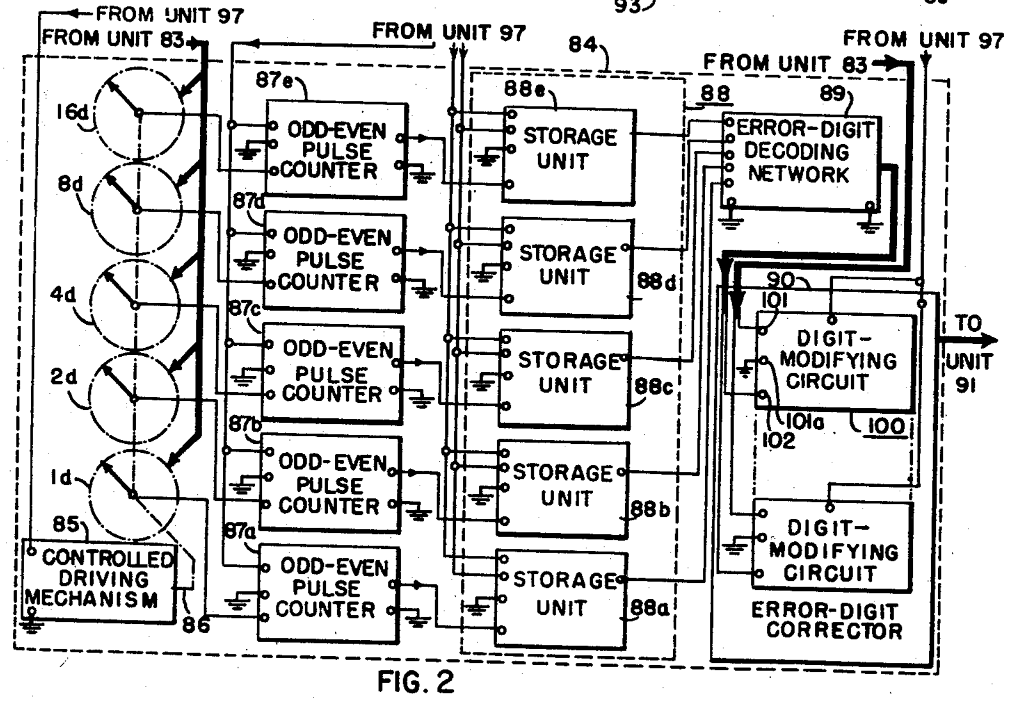
FIG. 2 is a schematic circuit diagram of an error-correcting computer of the FIG. 1 equipment.

Referring for the moment to FIG. 2, the error-correcting computer 84 is there represented in greater detail. The computer comprises message-digit and check-digit scanners **1*d*, 2*d*, 4*d*, 8*d*, 16*d* individually responsive to predetermined digital combinations of the message-code and check-code pulse groups. The message-digit and check-digit scanners are represented for simplicity of explanation as mechanical scanners but suitable equivalent electrical circuits may be substituted therefor. Each scanner has 15 segments connected to 15 predetermined storage units of the message-digit and check-digit register 83. The circuit connections between the message-digit and check-digit register 83 and the scanners 1*d*, 2*d*, 4*d*, 8*d*, and 16*d*** may be more readily understood by referring to the FIG. 3 (of the parent patent) chart.

As explained in connection with the FIG. 1 (of the parent patent) transmitting system, the symbol 1 in any box of the FIG. 3 (of the parent patent) chart indicates a circuit connection between the storage unit represented by the column heading and the scanner represented by the row heading while the symbol 0 in any box of the chart indicates the absence of a connection between the storage unit and the scanner. The message-digit and check-digit register includes 30 storage units which may be considered as numbered consecutively from 1–30, inclusive. Storage units 16–30, inclusive, are individually connected to the 15 segments of the scanner **16*d* as indicated by the symbol 1 in row 16 of the chart. Similarly, the 15 storage units of the message-digit and check-digit register 83 connected to the message-digit and check-digit scanner 8*d* are units 8–15, inclusive, and 25–30, inclusive, as indicated by row 8 of the chart. The storage units of the message-digit and check-digit register 83 connected to the scanners 4*d*, 2*d*, and 1*d*** are indicated in like manner by the chart.

The message-digit and check-digit scanners 1*d*, 2*d*, 4*d*, 8*d*, 16*d* may be operated in synchronium by any suitable means such as, for example, a controlled driving mechanism 85 of conventional construction connected to the movable arms of the scanners as indicated by the broken line 86. The movable arms of the scanners 1*d*, 2*d*, 4*d*, 8*d*, 16*d* are connected to odd-even pulse counters 87*a*—87*e*, inclusive, respectively, for developing control signals representing the odd-even sum values of the message-code and check-code pulses of the last-mentioned combinations, these values being jointly representative in code of the digits of any single signal-translation error in the predetermined plurality of message-code groups. The odd-even counters 87*a*–87*e*, inclusive, may, for example, be of similar construction to the odd-even pulse counters 1*a*, 2*a*, 4*a*, 8*a*, 16*a* of the FIG. 2 (of the parent patent) check-digit computer.

There are also provided second pulse-storage circuit units 88*a*–88*e*, inclusive, of an error-digit code register 88 coupled to the counters 87*a*–87*e*, inclusive, respectively, for storing the control signals developed thereby. Units 88*a*–88*e*, inclusive, may individually be of construction similar to the pulse-storage unit represented by FIG. 1*a* of the drawings of the parent patent.

An error-digit decoding network 89 is coupled to the second pulse-storage units and has a plurality of output circuits individually corresponding to the message-code digits stored by the FIG. 1 message-digit and check-digit register 83 for developing a control signal in that output circuit corresponding to the erroneous message-code digit. More particularly, the error-digit decoding network 89 has 5 input circuits individually connected to the pulse-storage units of the error-digit code register 88 and 25 output circuits individually corresponding to the 25 message digits in the predetermined plurality of 5 message-code pulse groups. These 25 output circuits may be considered as being numbered 3, 5–7, inclusive, 9–15, inclusive, and 17–30, inclusive, to correspond with the selected numbering of the message digits. An error-digit decoding network of a type suitable for use as the network 89 is described in an article entitled "Rectifier Networks for Multiposition Switching" by D. R. Brown and N. Rochester in the February, 1949 issue of the Proceedings of the I.R.E. published by The Institute of Radio Engineers, Inc.

The error-correcting computer also includes an error-digit corrector 90 comprising digit-modifying circuits individually coupled to the output circuits of the error-digit decoding network 89 and to the message pulse-storage units of the message-digit and check-digit register 83 for correcting the erroneous message-code digit. The error-digit corrector 90 preferably comprises 25 digit-modifying circuits such as the one represented in FIG. 3 which will be described in detail hereinafter.

Referring again to FIG. 1, the error-correcting circuit means preferably also includes third pulse-storage circuit units individually coupled to the digit-modifying circuits of the error-correcting computer 84 for storing the corrected message-code digits. More particularly, these pulse-storage units comprise a message-digit register 91 which may be of similar construction to the message-digit register 53 of the FIG. 1 (of the parent patent) transmitting system.

The pulse-code-receiving system also includes pulse-decoding means responsive to the corrected message-code groups for reproducing the discrete message symbols. The pulse-decoding means preferably comprises a pulse-triggered message-digit scanner 92 represented for simplicity of explanation as a mechanical scanner. The message-digit scanner 92 is coupled to the pulse-storage circuit units of the message-digit register 91 for sequentially deriving therefrom the corrected message-code pulses in groups in a predetermined order and for generating start-stop synchronizing digits for each such group. The scanner comprises several segments of single-digit length shown in part in the drawing. The segments connected to the pulse-storage circuit units of the message-digit register 91 are numbered 1*e*–25*e*, inclusive, and are separated in groups of 5 by segments designated stop and start and connected to the positive and negative terminals of a source +B′, respectively, as indicated in the drawing. The scanner also includes a movable arm 92*a* connected to a controlled driving mechanism 93 of conventional construction as indicated by the broken line 94.

The pulse-decoding means also includes an automatic-telegraph printer 95 responsive to the corrected message-code pulse groups and to the start-stop synchronizing digits for sequentially reproducing the discrete message symbols subject to reduced error. The automatic-telegraph printer may be of conventional construction, for example, of the type decribed at pages 18–27 to 18–29, inclusive, of the above-mentioned "Electrical Engineers' Handbook."

The receiving system further includes synchronizing circuits comprising a synchronizing-signal recognizer 96 coupled to the relay contact 83*b* of the radio-frequency receiver 81 and responsive to either part of the received two-part synchronizing signal. The synchronizing-signal recognizer 96 will subsequently be decribed in detail. There are also provided trigger-pulse generators 97 generally similar in construction to the synchronizing circuits of the FIG. 1 (of the parent patent) transmitting system comprising the relay winding 63*a*, relay contact 63*b*, triggered-pulse generator 64, relay winding 71*a*, relay contact 71*b*, sampling-pulse and shifting-pulse generator 65, sampling pulse counter 66, keying-pulse generators 67, and reset pulse generator 68. The trigger-pulse generators 97 are coupled to the recognizer 96 for generating pulses for triggering the pulse-storage means comprising the shifting register 82 in synchronism with the supply of individual digits of the message-code groups and for triggering the error-correcting circuit means comprising units 84 and 91 and the pulse-decoding means comprising the scanner 92 in synchronium with the supply of a predetermined plurality of message-code groups. In particular, various trigger-pulse generators of unit 97 are connected to the controlled driving mechanism 85 and the storage units 88*a*–88*e*, inclusive, of the computer 84 for triggering those circuits. A relay winding 83*a* associated with the contact 83*b* and a relay winding 79*a* associated with the contact 79*b* are also connected to the trigger-pulse generators 97 for operation in synchronism with the supply of the predetermined plurality of message-code groups. Connections are also provided from various reset-pulse generators of the unit 97 to the registers 83 and 91 and to the odd-even pulse counters 87*a*–87*e*, inclusive, and storage units 88*a*–88*e*, inclusive, of the computer 84 for resetting those circuits to their reference operating conditions at proper times.

*Operation of FIG. 1 Pulse-code-receiving system*

Considering now the operation of the FIG. 1 pulse-code-receiving system, the radio-frequency receiver 81 derives the modulation components of the radio-frequency signal representing synchronizing pulses and message-code and check-code pulses and transmitted by the FIG. 1 (of the parent patent) pulse-code-transmitting system and intercepted by the antenna 80, 80 of the FIG. 1 receiving system. The pulses derived from the received signal are applied to the synchronizing-signal recognizer 96 which triggers the trigger-pulse generators 97 in a manner more fully explained subsequently. One of the trigger-pulse generators 97 then applies to the relay winding 83*a* a pulse which energizes the relay winding 83*a* during the entire period of reception of the message-code and check-code pulses.

While the relay winding 83*a* is energized, closing the contact 83*b*, the radio-frequency receiver is coupled to the shifting register 82 to apply the received message-code and check-code pulses thereto during sampling intervals when the relay contact 79*b* is closed, as determined by the operation of the trigger-pulse generators 97. The shifting register 82 operates in a manner similar to the shifting register 51 of the FIG. 1 (of the parent patent) transmitting system for storing the 25 message-code and 5 check-code digits representing 5 message symbols together with check-code information. To this end, the trigger-pulse generators 97 apply a group of 30 shifting pulses to the shifting register 82 individually followed in time by 30 sampling pulses which are applied to the relay winding **79*a*. When the 30 message-code and check-code digits of a received-signal digit group have been stored by the shifting register 82, the 30 storage units of the shifting register then simultaneously apply signals representing the stored digits to the message-digit and check digit register 83. At this time, when keyed by one of the trigger-pulse generators 97, the message-digit and check-digit register 83 stores the 30 digits applied thereto in 30 individual storage units. The message-digit and check-digit register 83 then applies signals representing the 30 stored digits to the error-correcting computer 84**.

Assuming that during signal-transmission from the FIG. 1 (of the parent patent) transmitting system to the FIG. 1 receiving system there has been no signal-translation error in any of the 30 message-code and check-code signal digits, the error-correcting computer applies signals representing the 25 message digits as received to the message-digit register 91 which stores the same when triggered by one of the trigger-pulse generators 97. The message-digit register 91 then applies signals representing the 25 stored message digits to the 25 segments **1*e*–25*e*, inclusive, of the message-digit scanner 92**.

When triggered by one of the trigger-pulse generators 97, the controlled driving mechanism 93 once rotates the movable arm of the message-digit scanner 92 which develops in succession 5-digit message-code pulse groups individually preceded by a start-synchronizing digit and followed by a stop-synchronizing digit and corresponding to the signal generated by the automatic-telegraph sender 50 of the FIG. 1 (of the parent patent) transmitting system. The start-synchronizing and stop-synchronizing digits just mentioned are generated by the scanner 92 as the movable arm **92*a*** thereof sweeps by the start and stop segments of the scanner immediately preceding and following each group of 5 message-digit segments. The normal rest position of the scanner arm between sweeps is at a stop segment, as shown in the drawing.

The automatic-telegraph printer 95 responds to the signal applied thereto by the scanner 92 in a well-known manner to reproduce the discrete message symbols typed by the operator of the automatic-telegraph sender 50 of the FIG. 1 (of the parent patent) transmitting system.

In the event that the radio-frequency signal transmitted from the FIG. 1 (of the parent patent) transmitting system to the FIG. 1 receiving system sustains a single signal-translation error in one of the message digits thereof, changing the digit, for example, from a pulse to a space, or vice versa, the message digits stored by the shifting register 82 and the message-digit and check-digit register 83 then include an erroneous digit. This erroneous digit, if not corrected, would cause an error in one letter of the 5-letter word represented by the 25 message digits. It is the function of the error-correcting computer 84 to determine whether a single signal-translation error in one of the message digits has occured, and if so, to correct the erroneous digit.

Referring for the moment to FIG. 2, which represents the error-correcting computer 84, the 30 message-code and check-code digits, including the erroneous message digit, are applied in predetermined digital combinations to the message-digit and check-digit scanners **1*d*, 2*d*, 4*d*, 8*d*, and 16*d*. As explained previously in connection with the FIG. 3 (of the parent patent) chart, the message-digit and check-digit register 83 applies digits 16–30, inclusive, to the message-digit and check-digit scanner 16*d* while the register 83 applies digits 8–15, inclusive, and 24–30, inclusive, to the scanner 8*d*. The predetermined digital combinations applied to the scanners 4*d*, 2*d*, and 1*d*** are indicated in like manner by the chart.

In response to a trigger pulse supplied at the proper time by one of the trigger-pulse generators 97, the controlled driving mechanism 85 then once rotates the movable arms of the scanners **1*d*, 2*d*, 4*d*, 8*d*, and 16*d* which scan the signals applied to the scanner segments and representing the message and check digits in a manner similar to the scanning of the message digits by the message-digit scanners 1*a*, 2*a*, 4*a*, 8*a*, and 16*a* of the FIG. 2 (of the parent patent) check-digit computer. Accordingly, the message-digit and check-digit scanners 1*d*, 2*d*, 4*d*, 8*d*, 16*d* apply to the odd-even pulse counters 87*a*–87*e*, inclusive, respectively, pulses representative of the pulses stored by the message-digit and check-digit register 83**.

If the erroneous message digit is not included in the digital combination represented by signals applied to a given scanner, that scanner applies an even number of pulses to the corresponding odd-even pulse counter. For example, assuming that message digit 7 was transmitted as a pulse and sustained error causing it to be received as a space, the digital combination represented by signals applied to the message-digit and check-digit scanner **16*d* is not affected by the error since that combination does not include message digit 7. Message-digit and check-digit scanner 16*d* responds to message digits 17–30, inclusive, and to check digit 16 which was added to make the total of the pulses in digits 16–30, inclusive, an even number. Accordingly, notwithstanding the error in message digit 7, message-digit and check-digit scanner 16*d* applies an even number of pulses to the odd-even pulse counter 87*e*. Similarly, since message digit 7 is not included in the predetermined digital combination applied to message-digit and check-digit scanner 8*d*, that scanner applies an even number of pulses to the odd-even pulse counter 87*d***.

Figure 3:
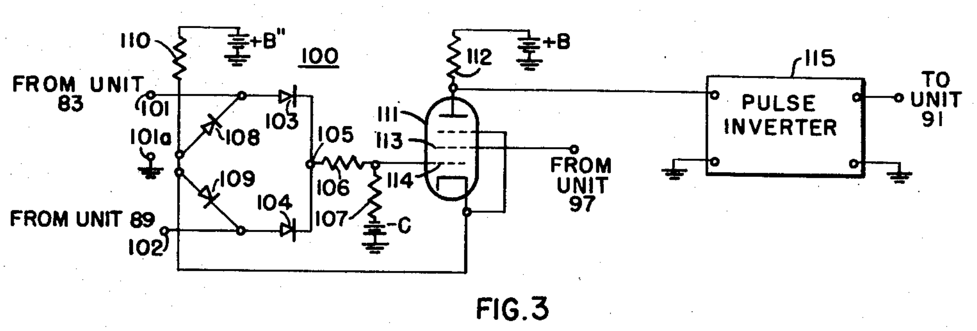
FIG. 3 is a circuit diagram of a portion of the FIG. 2 computer.

The predetermined digital combination represented by signals applied to message-digit and check-digit scanner **4*d*, however, includes message digit 7, as indicated by the FIG. 3 (of the parent patent) chart. As also indicated by the chart, check digit 4 was added to the predetermined digital combination of message digits 5–7, inclusive, 12–15, inclusive, 19–23, inclusive, and 28–30, inclusive, to make the total of the pulses in that combination together with the check digit 4 an even number. Accordingly, since message digit 7 sustained an error changing from a pulse to a space, message-digit and check-digit scanner 4*d* applies an odd number of pulses to the odd-even pulse counter 87*c*. Likewise, message-digit and check-digit scanners 1*d* and 2*d* apply an odd number of pulses to odd-even pulse counters 87*a* and 87*b*, respectively, since message digit 7 is included in each of the predetermined digital combinations applied to the message-digit and check-digit scanners 1*d* and 2*d***.

The odd-even pulse counters **87*a*–87*e*, inclusive, operate in a manner similar to the odd-even pulse counters 1*b*, 2*b*, 4*b*, 8*b*, and 16*b* of the FIG. 2 (of the parent patent) check-digit computer, that is, each counter develops, for example, a high potential in the output circuit thereof when an odd number of pulses is applied thereto and develops a low potential therein when an even number of pulses is applied thereto. Accordingly, under the assumed operating conditions, counters 87*a*–87*c*, inclusive, develop high potentials in the output circuits thereof while counters 87*d* and 87*e* develop low potentials. This permutation of output-circuit potentials uniquely indicates that an error has occurred in message digit 7. If the error had occurred in another message digit, another unique permutation of output-circuit potentials would be developed by the odd-even pulse counters 87*a*–87*e***, inclusive.

The odd-even pulse counters **87*a*–87*e***, inclusive, apply the 5 signals uniquely representing that an error has occurred in message digit 7 to storage units 88a–88e, inclusive, respectively, of the error-digit code register 88. When triggered by a pulse from one of the trigger pulse generators 97, the error-digit code register 88 stores the signal permutation applied thereto. The register 88 then applies the stored signals to the error-digit decoding network 89 which, as previously mentioned, has 25 output circuits individually corresponding to the 25 message digits. The error-digit decoding network develops a positive output potential only in the one of the 25 output circuits corresponding to an erroneous message digit, for example, output circuit 7 corresponding to the message digit 7. This output circuit of the error-digit decoding network 89 then applies the developed potential to the corresponding digit-modifying circuit of the error-digit corrector 90, for example, digit-modifying circuit 7. Message-digit and check-digit register 83 also applies the 25 message digits stored therein, including the erroneous digit 7, individually to the 25 digit-modifying circuits of the error-digit corrector 90.

Digit-modifying circuit 7 responds to the signal developed in the output circuit 7 of the error-digit decoding network 89 and to the signal representing message digit 7 supplied by the message-digit and check-digit register 83 to change the erroneous message digit 7 from a space to a pulse, in a manner more fully described subsequently. The remaining digit-modifying circuits of the error corrector 90 effectively translate the digits represented by signals applied thereto without modification. Accordingly, the error-digit corrector 90 develops in the 25 output circuits of the 25 digit-modifying circuits thereof signals representing the message digits including message digit 7 as corrected. The error-digit corrector 90 applies the corrected message-digit group to the message-digit register 91 of the FIG. 1 receiving system which operates in conjunction with the scanner 92 and the automatic-telegraph printer 95, in the manner previously described, to reproduce the discrete message symbols typed by the operator of the automatic-telegraph sender 50 of the FIG. 1 (of the parent patent) transmitting system.

If the radio-frequency signal transmitted from the FIG. 1 (of the parent patent) transmitting system to the FIG. 1 receiving system sustains a single signal-translation error in one of the check digits thereof, then no errors will ordinarily occur in the message digits associated therewith since, as explained previously, an error rate of one error approximately every 35 digits may be considered as a maximum rate. Under such operating conditions, the five signals developed by the odd-even pulse counters 87a–87e, inclusive, and stored in storage units 88a–88e, inclusive, respectively, uniquely represent that an error has occurred in a given check digit. The error-digit decoding network 89 develops a positive output potential indicating an erroneous digit in one of the 25 output circuits thereof when an error has occurred in a message digit but does not develop a positive output potential in any of the output circuits when an error has occurred in a check digit. Accordingly, the 25 digit-modifying circuits of the error-digit corrector 90 then develop in the output circuits thereof signals representing the message digits translated without error notwithstanding the erroneous check digit. For some applications, the error-digit decoding network 89 may include 5 additional output circuits corresponding to check digits and the error-digit corrector 90 may include 5 additional digit-modifying circuits for correcting an erroneous check digit in a manner similar to that explained in connection with the correction of an erroneous message digit.

*Description of FIG. 3 digit-modifying circuit*

Referring now more particularly to FIG. 3, there is represented, in detail, one of the 25 digit-modifying circuits included in the FIG. 2 error-digit corrector 90. The digit-modifying circuit 100 has first and second pairs of input terminals 101, 101a, and 102, 101a for connection to one of the storage units of the message-digit and check-digit register 83 of the FIG. 1 receiving system and to the corresponding output circuit of the error-digit decoding network 89 of the FIG. 2 error-correcting computer 84, respectively. The input terminals 101 and 102 are connected through suitable diode rectifiers 103, 104, respectively, comprising, for example, contact rectifiers, to a common terminal 105 of a voltage divider comprising resistors 106 and 107 series-connected to a suitable source of bias potential, represented as a battery −C. The input terminals 101 and 102 are also connected through diode rectifiers 108 and 109, respectively, and a resistor 110 to a source of positive potential, represented as a battery +B″.

The digit-modifying circuit 100 also includes a normally nonconductive tube 111 having a cathode connected to the resistor 110 and an anode coupled through a load resistor 112 to a source of positive potential, shown as a battery +B, and to a pulse inverter 115 of conventional construction, for connection to the FIG. 1 message-digit register 91. A first control electrode 114 of the tube 111 is connected to the junction of the resistors 106 and 107 for applying a control signal to the tube. The tube also includes a second control electrode 113 for connection to one of the trigger-pulse generators 97 of the FIG. 1 receiving system for applying a trigger pulse to the tube.

*Operation of FIG. 3 digit-modifying circuit*

The function of the digit-modifying circuit 100 is to determine whether the message digit applied to the circuit is erroneous and, if so, to correct the erroneous digit. The output signal of the tube 111 represents the corrected digit.

Assuming for the moment that a storage unit of the message-digit and check-digit register 83 of the FIG. 1 system applies to the input terminals 101, 101a, for example, a zero-potential signal representing a message-digit space which has not sustained signal-translation error, then the error-digit decoding network 89 maintains the terminal 102 at zero potential with respect to terminal 101a, representing that no error has occurred in the digit. Current then flows from the source +B″ through the resistor 110, and both diodes 108 and 109 to the zero-potential terminals 101 and 102, respectively, to maintain the cathode of the tube 111 at approximately zero potential. Likewise, diodes 103 and 104 conduct through the resistors 106 and 107 and the source −C to maintain the junction 105 at zero potential. The normally nonconductive tube 111 requires the coincident application of a positive trigger pulse to the control electrode 113 and a positive potential to the junction 105 to render the tube conductive for the duration of the trigger pulse. Accordingly, the junction of the resistors 106 and 107 is sufficiently negative under the assumed operating conditions to maintain the tube 111 nonconductive when a trigger pulse is applied to the control electrode 113 thereof. Hence, no output pulse is developed across the load resistor 112 for application to the input circuit of the message-digit register 91 of the FIG. 1 receiving system. The absence of an output pulse from the corrector 90 correctly represents the message-digit space applied to the digit-modifying circuit 100 and effectively translated therethrough without modification.

When the message-digit and check-digit register 83 of the FIG. 1 receiving system applies to the terminals 101, 101a of the digit-modifying circuit 100 a positive potential, representing a pulse which has not sustained signal-translation error, the error-digit decoding network 89 again maintains the input terminal 102 at zero potential representing that no error has occurred in the digit. The diode 109 then conducts, maintaining the cathode of the tube 111 approximately at zero potential while the diode 108 is nonconductive since the terminal 101 is at a positive potential. Current also flows through the diode 103, the resistors 106, 107 and the source —C raising the potential at the junction 105 approximately to the potential of the input terminal 101. Accordingly, the diode 104 is maintained nonconductive, since the terminal 102 is at a potential below the potential of the junction 105. The values of the resistors 106 and 107 are so proportioned that the control electrode 114 of the tube 111 assumes a potential sufficient to render the tube 111 conductive when a trigger pulse is applied to the control electrode 113 by one of the trigger-pulse generators 97. Accordingly, the digit-modifying circuit 100 then develops across the anode-load resistor 112 a negative output pulse which is inverted by the pulse inverter 115 and applied to the message-digit register 91 of the FIG. 1 receiving system, thereby effectively translating without modification the correct message-digit pulse applied to the input terminals 101, 101*a* thereof.

When the FIG. 1 register 83 applies an erroneous message digit to the digit-modifying circuit 100, the corresponding output circuit of the error-digit decoding network 89 of the FIG. 2 error-correcting computer applies to the input terminal 102 of the digit-modifying circuit 100 a positive potential representing that an error has occurred as explained previously. Assume that the message digit represented by the signal applied to the terminals 101, 101*a* by the message-digit and check-digit register 83 is erroneously represented by a zero-potential signal as a space. Accordingly, the terminal 101 is at zero potential while the terminal 102 is at a positive potential. Current then flows through the source +B″, the resistor 110, and the diode 108 to the terminal 101 to maintain the cathode of the tube 111 at approximately zero potential while the diode 109 is nonconductive. The diode 104 conducts through the resistors 106, 107, and the source —C to maintain the junction 105 approximately at the positive potential of the terminal 102. The diode 103 is nonconductive because of the positive potential at the junction 105 and zero potential at the terminal 101.

Since the junction 105 is at a positive potential, the tube 111 conducts when triggered by a pulse from one of the trigger-pulse generators 97 and develops an output pulse across the anode-load resistor 112 thereof. Accordingly, although the message-digit and check-digit register 83 applied to the error-digit modifying circuit 100 an erroneous zero-potential signal representing a space, the tube 111 develops in the output circuit thereof an output pulse representing the translated message digit as a pulse. Thus, the digit-modifying circuit 100 corrects an erroneous message-digit space applied thereto changing the space to a pulse.

When the FIG. 1 message-digit and check-digit register 83 applies to the input terminals 101, 101*a* a positive potential representing an erroneous message-digit pulse, the FIG. 2 error-digit decoding network 89 applies to the terminal 102 a positive potential representing that an error has occurred. Current then flows through the source +B″, the resistor 110, and both diodes 108 and 109 to their respective input terminals 101, 102 maintaining the cathode of the tube 111 approximately at the positive potential of the terminals 101 and 102. Also, both diodes 103 and 104 conduct through resistors 106, 107 and the source —C maintaining the junction 105 at the potential of the input terminals 101 and 102. The control electrode of the tube 111 then is sufficiently negative to maintain the tube nonconductive when one of the trigger-pulse generators 97 applies a trigger pulse to the control electrode 113. Accordingly, no output pulse is developed across the anode-load resistor 112 by the digit-modifying circuit 100 for application to the storage unit of the message-digit register 91 of the FIG. 1 receiving system. Thus, the digit-modifying circuit effectively changes an erroneous message-digit pulse to a message-digit space, thereby correcting the signal-translation error.

Briefly summarizing the operation of the FIG. 3 digit-modifying circuit 100, when the input signals applied to the terminals 101, 101*a* and 102, 101*a* are the same, that is, both zero or both positive, the digit-modifying circuit does not develop an output pulse for application to the corresponding storage unit of the message-digit register 91 of the FIG. 1 receiving system. When the input signals applied to the terminals 101, 101*a* and 102, 101*a* differ, the digit-modifying circuit 100 applies a positive output pulse to the message-digit register 91 representing a message-digit pulse. Also, from the foregoing explanation, it will be seen that the digit-modifying circuit 100 effectively translates without modification a correct message digit while the circuit corrects an erroneous message digit.

Figure 4:
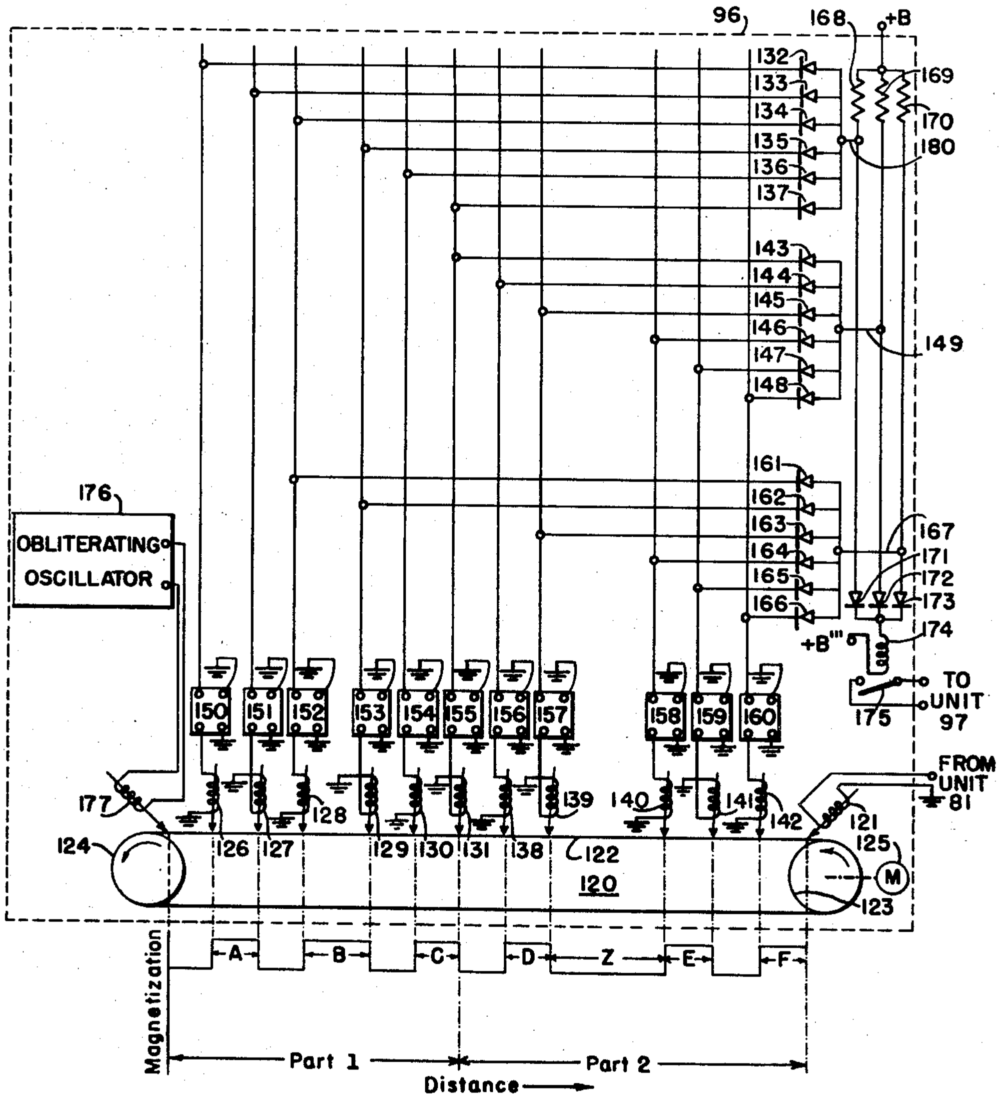
FIG. 4 is a circuit diagram, partly schematic, of a synchronizing-signal recognizer of the FIG. 1 equipment and includes a graph representing a magnetization-distribution characteristic of a portion of the synchronizing-signal recognizer.

*Description of FIG. 4 synchronizing-signal recognizer*

Referring now more particularly to FIG. 4 of the drawings, there is represented in detail the synchronizing-signal recognizer 96 of the FIG. 1 receiving system. The synchronizing-signal recognizer 96 preferably comprises pulse-storage means coupled to the supply circuit comprising the radio-frequency receiver 81 of the FIG. 1 receiving system for storing the synchronizing-pulse groups applied thereto by the receiver. More particularly, the pulse-storage means just mentioned comprises, for example, tape-recording means 120 of a conventional type including a recording head 121 coupled to the receiver 81 of the FIG. 1 system and a magnetic-tape roll 122 mounted on rotatable drive and guide wheels 123, 124, respectively, driven by a motor 125. The tape-recording means also includes a conventional obliterating oscillator 176 and oblitering head 177.

There preferably is also provided a pair of means individually responsive to the stored synchronizing-pulse groups for individually deriving control signals therefrom. This pair of means comprises, for example, a first group of pick-up heads 126–131, inclusive, responsive to the leading and trailing pulse edges of one of the stored synchronizing-pulse groups and a first group of normally conductive, unidirectionally conductive devices 132–137, inclusive, coupled to the pick-up devices 126–131, inclusive, respectively, and having a common terminal 180 for deriving a first control pulse from the aforesaid one synchronizing-pulse group. The pick-up heads 126–131, inclusive, may be of conventional construction for deriving a differentiated pulse from each leading and trailing synchronizing pulse edge, such as, for example, described in an article entitled "Frequency-Modulated Magnetic-Tape Transient Recorder," by Harry B. Sharper, published in the November 1945 issue of the Proceedings of the I.R.E. The devices 132–137, inclusive, preferably comprise normally conductive contact diodes.

The pair of synchronizing-pulse-responsive means also comprises, for example, a second group of pick-up heads 131 and 138–142, inclusive, of similar construction to the first group of such heads 126–131, inclusive, and responsive to the leading and trailing pulse edges of the other of the stored synchronizing-pulse groups. The responsive means also includes a second group of normally conductive, unidirectionally conductive devices 143–148, inclusive, similar to the first group of such devices 132–137, inclusive, and coupled to the pick-up heads 131 and 138–142, inclusive, respectively, and having a common terminal 149 for deriving a second control pulse from the aforesaid other synchronizing-pulse group.

There preferably are coupled between the pick-up heads 126–131, inclusive, and 138–142, inclusive, and the diodes 132–137, inclusive, and 143–148, inclusive, respectively, several triggered-pulse generators 150–160, inclusive, individually responsive to output pulses supplied by the pick-up heads for developing positive-potential pulses of slightly longer duration. Each of the generators 150–160, inclusive, may, for example, comprise a triggered one-pulse multivibrator of the type described at pages 9–18 of the above-mentioned "Electrical Engineers' Handbook."

The synchronizing-signal recognizer preferably also includes means responsive to predetermined pulses of the synchronizing-pulse groups for deriving a third control signal therefrom. More particularly, this means comprises, for example, the pick-up heads 128, 129, 139–142, inclusive, and normally conductive, unidirectionally conductive devices 161–166, inclusive, individually coupled thereto and having a common terminal 167.

The terminals 180, 149, and 167 preferably are coupled to a control circuit responsive to any of the above-mentioned control signals for effectively utilizing the same for triggering the pulse-storage means 82, 83, the error-correcting computer 84, the message-digit register 91, and the pulse-decoding means comprising the scanner 92 and the automatic-telegraph printer 95 of the FIG. 1 system. The control circuit preferably includes voltage-dropping resistors 168–170, inclusive, individually coupled to a suitable source of positive potential +B and to normally nonconductive contact diodes 171, 172, and 173, respectively. These diodes are individually connected to one terminal of the normally de-energized relay winding 174 having its other terminal connected to a source of positive bias potential +B''' for maintaining the diodes 171–173, inclusive, nonconductive. A normally open relay contact 174 is associated with the relay winding 174. The relay contact 175 is coupled to the input circuit of one of the trigger-pulse generators 97 of the FIG. 1 receiving system.

*Operation of FIG. 4 synchronizing-signal recognizer*

Considering now the operation of the synchronizing-signal recognizer 96 of the FIG. 1 receiving system, the radio-frequency receiver 81 applies the modulation components of a received synchronizing signal through the relay contact **83*b* to the synchronizing-signal recognizer 96. More particularly, as represented in FIG. 4, the receiver applies the synchronizing signal to the recording head 121 of the tape-recording means 120. The recording head 121 records the synchronizing signal on the magnetic tape 122 as magnetization variations as the tape passes under the recording head in a conventional manner. When the 12 pulses and spaces of the 14-digit synchronizing signal have been recorded on the tape 122**, in the absence of noise interference with the received synchronizing signal the tape has a magnetization-distribution characteristic as indicated by the graph of FIG. 4.

The magnetization-distribution characteristic represented by the FIG. 4 graph corresponds to the modulation components of the received radio-frequency synchronizing signal. The leading and trailing edges of the magnetization pulses of the tape 122 simultaneously pass under individual ones of the pick-up heads 126–131, inclusive, and 138–142, inclusive, as indicated in FIG. 4. The pick-up heads effectively transform by differentiation in a usual manner the leading and trailing edges of the synchronizing pulses represented by the magnetization pulses to positive-potential pulses of short duration and occurring substantially simultaneously. To this end, the even-numbered pick-up heads and the odd-numbered pick-up heads are individually connected with opposite polarities to the generators 150–160, inclusive, so that the even-numbered pick-up heads develop positive-potential pulses in response to leading synchronizing-pulse edges while the odd-numbered pick-up heads develop positive-potential pulses in response to trailing synchronizing-pulse edges. These positive-potential pulses are simultaneously applied to the triggered-pulse generators 150–160, inclusive, which individually develop positive-potential pulses of slightly longer duration for tolerance purposes to ensure simultaneity of at least portions thereof notwithstanding any small differences which may occur in the timing of the pulses derived by the pick-up heads.

The output pulses of the triggered-pulse generators 150–160, inclusive, simultaneously render nonconductive the normally conductive diodes 132–137, inclusive, 143–148, inclusive, and 161–166, inclusive. When all of the diodes of any one of the groups just mentioned are nonconductive, the potential at the corresponding one of the junctions 180, 149, and 167 rises sufficiently to render conductive the corresponding one of the diodes 171–173, inclusive. Accordingly, because all the diodes 132–137, inclusive, 143–148, inclusive, and 161–166, inclusive, are rendered nonconductive under the described operating conditions, the potential at each of the junctions 180, 149, and 167 rises, rendering conductive the normally nonconductive diodes 171, 172, and 173. The current flow through any of the three diodes 171–173, inclusive, is sufficient to energize the normally de-energized relay winding 174, thereby closing the normally opened relay contact 175 to trigger the triggered-pulse generators 97 and cause the application of the following 30 message-code and check-code digits to the shifting register 82 of the FIG. 1 receiving system in the manner explained previously.

As the magnetic tape 122 passes under the obliterating head 177, the signal thereon is obliterated in a conventional manner to ready the tape for subsequent use.

In the event that noise interference with the received signal during the transmission thereof from the FIG. 1 (of the parent patent) transmitting system to the FIG. 1 receiving system causes the distortion or effective loss of one synchronizing digit of the 14-digit group by, for example, changing the digit from a pulse to a space or vice versa, one part of the synchronizing signal will then be ineffective to cause synchronization. For example, assume that noise changes pulse A from a pulse to a space. The pick-up devices 126 and 127 then are ineffective to supply positive-potential pulses to the triggered-pulse generators 150 and 151 at the time that the other pick-up heads supply such pulses to their corresponding generators. Accordingly, diodes 132 and 133 remain conductive while the other diodes 134–137, inclusive, 143–148, inclusive, and 161–166, inclusive, are rendered nonconductive. In order for the potential at the junction 180 to rise sufficiently to render conductive the diode 171 all of the diodes 132–137, inclusive, must conduct. The doide 171 therefore remains nonconductive. The potentials at junctions 149 and 167, however, rise sufficiently to render conductive the diodes 172 and 173 and cause energization of the relay winding 174, thereby effecting synchronization.

Assume now that noise changes pulse C from a pulse to a space, thereby introducing error into both parts of the synchronizing signal. The pick-up devices 130 and 131 then are ineffective to trigger the generators 154 and 155 at the proper time. The diodes 136, 137, and 143 remain conductive and the potential at each of the junctions 180 and 149 does not rise sufficiently to render conductive the diodes 171 and 172. The combination of pick-up devices 128, 129, and 139–142, inclusive, however, is rendered nonconductive in its entirety, causing the potential at junction 167 to rise sufficiently to render conductive the diode 173 and energize the relay winding 174 to effect synchronization.

From the foregoing examples, it will be seen that no loss of synchronization occurs notwithstanding one error in any of the synchronizing-pulse groups or several errors in the same synchronizing-pulse group. Since the synchronizing-pulse groups are distinguishable from each other, the pick-up heads 126–131, inclusive, of the first group are simultaneously responsive only to the first part of the synchronizing signal and the pick-up heads 131 and 138–142, inclusive, of the second group are simultaneously responsive only to the second part of the synchronizing signal. Similarly, pick-up devices 128, 129, and 139–142, inclusive, of the combination group are simultaneously responsive only to a predetermined combination of portions of the first and second synchronizing-signal parts. Further, since each of the synchronizing-pulse groups includes a nonintegral digit, for example, digits B and Z of 1½ digit and 2½ digit duration, respectively, noise which alters one-half to one digit of succeeding message-code and check-code digits will ordinarily be ineffective to cause the message-code pulse groups to assume the same pulse formation as either part of the synchronizing signal. Also, noise ordinarily is ineffective to alter one part of the synchronizing signal in such manner as to cause that part to assume the same pulse formation as the other part. Thus, the likelihood of loss of synchronization or improper synchronization is small.

From the foregoing description, it will be apparent that a self-correcting pulse-code-communication system constructed in accordance with the invention has several advantages. In the first place, the system has the advantage of translating message-code pulses representative of discrete message symbols and reproducing the symbols subject to reduced error. The system also has the advantage of translating message-code pulse groups individually representative of discrete message symbols and utilizing a minimum number of check-code pulses for checking a predetermined plurality of the message-code pulse groups for signal-translation error. Further, the system has the advantage of being adapted for use in privacy or secrecy systems since it utilizes a 5-digit check-code pulse group for checking 5-digit message-code pulse groups for signal-translation error. The system has the additional important advantage that the message-code and check-code pulse groups may be synchronized by a single synchronizing signal which is capable of effecting synchronization notwithstanding one digital error therein. The system also has the advantage that it is capable of operating in conjunction with conventional automatic-telegraph sending and printing equipment.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An error-correcting pulse-code-receiving system for receiving a signal representing message-code pulses representative of discrete message symbols and check-code pulses for checking said signal for signal-translation error and for reproducing said symbols subject to reduced error comprising: code-pulse-supply circuit means for supplying said message-code pulses and said check-code pulses; pulse-storage means coupled to said supply circuit means for storing a predetermined plurality of plural-digit message-code pulse groups individually representative of said symbols and a check-code pulse group uniquely representative of predetermined digital relations in said plurality of message-code groups; error-correcting circuit means responsive jointly to said stored message-code and check-code groups for correcting error in said message-code groups; and pulse-decoding means responsive to said corrected message-code groups for reproducing said symbols.

2. An error-correcting pulse-code-receiving system for receiving a signal representing binary-permutation-code message pulses representative of discrete message symbols and binary-permutation-code check pulses for checking said signal for signal-translation error and for reproducing said symbols subject to reduced error comprising: code-pulse-supply circuit means for supplying said binary-permutation-code message pulses and said binary-permutation-code check pulses; pulse-storage means coupled to said supply circuit means for storing a predetermined plurality of plural-digit message-pulse groups individually representative of said symbols and a check-pulse group uniquely representative of predetermined digital relations in said plurality of message-pulse groups; error-correcting circuit means responsive jointly to said stored message-pulse and check-pulse groups for correcting error in said message-pulse groups; and pulse-decoding means responsive to said corrected message-pulse groups for reproducing said symbols.

3. An error-correcting pulse-code-receiving system for receiving a signal representing message-code pulses representative of discrete message symbols and check-code pulses for checking said signal for signal-translation error and for reproducing said symbols subject to reduced error comprising: code-pulse-supply circuit means for supplying said message-code pulses and said check-code pulses; pulse-storage means coupled to said supply circuit means for storing five 5-digit message-code pulse groups individually representative of said symbols and 1 check-code pulse group uniquely representative of predetermined digital relations in said 5 message-code groups; error-correcting circuit means responsive jointly to said stored message-code and check-code groups for correcting error in said message-code groups; and pulse-decoding means responsive to said corrected message-code groups for reproducing said symbols.

4. An error-correcting pulse-code-receiving system for receiving a signal representing message-code pulses representative of discrete message symbols and check-code pulses for checking said signal for signal-translation error and for reproducing said symbols subject to reduced error comprising: code-pulse-supply circuit means for supplying said message-code pulses and said check-code pulses; pulse-storage circuit means coupled to said supply circuit means for storing a predetermined plurality of plural-digit message-code pulse groups individually representative of said symbols and a check-code pulse group uniquely representative of predetermined digital relations in said plurality of message-code groups; each of said pulse storage circuit means having two operating conditions, one representing a stored pulse and the other representing the absence of a stored pulse; error-correcting circuit means responsive jointly to said stored message-code and check-code groups for correcting error in said message-code groups; and pulse-decoding means responsive to said corrected message-code groups for reproducing said symbols.

5. An error-correcting pulse-code-receiving system for receiving a signal representing message-code pulses representative of discrete message symbols and check-code pulses for checking said signal for signal-translation error and for reproducing said symbols subject to reduced error comprising: code-pulse-supply circuit means for supplying said message-code pulses and said check-code pulses; pulse-storage means coupled to said supply circuit means for storing a predetermined plurality of plural-digit message-code pulse groups individually representative of said symbols and a check-code pulse group uniquely representative of the odd-even pulse-sum values of predetermined digital combinations of said plurality of message-code groups; error-correcting circuit means responsive jointly to predetermined digital combinations of said stored message-code and check-code groups for deriving the odd-even pulse-sum values thereof for correcting error in said message-code groups; and pulse-decoding means responsive to said corrected message-code groups for reproducing said symbols.

6. An error-correcting pulse-code-receiving system for receiving a signal representing binary-permutation-code message pulses representative of discrete message symbols and binary-permutation-code check pulses for checking said signal for signal-translation error and for reproducing said symbols subject to reduced error comprising: code-pulse-supply circuit means for supplying said binary-permutation-code message pulses and check pulses; pulse-storage means coupled to said supply circuit means for storing a predetermined plurality of plural-digit message-code pulse groups individually representative of said symbols and a check-code pulse group uniquely representative of the odd-even pulse-sum values of digital combinations of said plurality of message-code groups so determined that each message digit is included in a unique permutation of said combinations; error-correcting circuit means responsive jointly to predetermined digital combinations of said stored message-pulse and check-pulse groups for deriving the odd-even sum values thereof for correcting error in said message-pulse groups; and pulse-decoding means responsive to said corrected message-pulse groups for reproducing said symbols.

7. An error-correcting pulse-code-receiving system for receiving a signal representing message-code pulses representative of discrete message symbols and check-code pulses for checking said signal for signal-translation error and for reproducing said symbols subject to reduced error comprising: code-pulse-supply circuit means for supplying said message-code pulses and said check-code pulses; pulse-storage means coupled to said supply circuit means for storing a predetermined plurality of plural-digit message-code pulse groups individually representative of said symbols and a check-code pulse group uniquely representative of predetermined digital relations in said plurality of message-code groups; error-correcting circuit means responsive jointly to said stored message-code and check-code groups for correcting error in said message-code and check-code groups for correcting error in said message-code groups; and automatic-telegraph pulse-decoding means responsive to said corrected message-code groups for sequentially reproducing said symbols.

8. An error-correcting pulse-code-receiving system for receiving a signal representing message-code pulses representative of discrete message symbols and check-code pulses for checking said signal for signal-translation error and for reproducing said symbols subject to reduced error comprising: code-pulse-supply circuit means for supplying said message-code pulses and said check-code pulses; first pulse-storage circuit means coupled to said supply circuit means for individually storing a predetermined plurality of plural-digit message-code pulse groups individually representative of said symbols and a check-code pulse group uniquely representative of predetermined digital relations in said plurality of message-code groups; message-digit and check-digit scanners individually responsive to predetermined digital combinations of said message-code and check-code pulse groups; odd-even pulse counter means individually coupled to said scanners for developing control signals individually representing the odd-even sum values of said message-code and check-code pulses in said combinations, said values being jointly representative in code of the digit of any single signal-translation error in said predetermined plurality of message-code groups; second pulse-storage circuit means individually coupled to said counter means for storing said control signals; error-digit-decoding circuit means coupled to said second pulse-storage means and having a plurality of output circuits individually corresponding to said message-code digits for developing a control signal in that output circuit corresponding to said erroneous message-code digit; digit-modifying circuit means individually coupled to said output circuits of said error-digit-decoding circuit means and to said first pulse-storage means for correcting said erroneous message-code digit; and pulse-decoding means responsive to said corrected message-code digits for reproducing said symbols.

9. An error-correcting pulse-code-receiving system for receiving a signal representing message-code pulses representative of discrete message symbols and check-code pulses for checking said signal for signal-translation error and for reproducing said symbols subject to reduced error comprising: code-pulse-supply circuit means for supplying said message-code pulses and said check-code pulses; first pulse-storage circuit means coupled to said supply circuit means for individually storing a predetermined plurality of plural-digit message-code pulse groups individually representative of said symbols and a check-code pulse group uniquely representative of predetermined digital relations in said plurality of message-code groups; message-digit and check-digit scanners individually responsive to predetermined digital combinations of said message-code and check-code pulse groups; odd-even pulse counter means individually coupled to said scanners for developing control signals representing the odd-even sum values of said message-code and check-code pulses in said combinations, said values being jointly representative in code of the digit of any single signal-translation error in said predetermined plurality of message-code groups; second pulse-storage circuit means individually coupled to said counter means for storing said control signals; error-digit-decoding circuit means coupled to said second pulse-storage means and having a plurality of output circuits individually corresponding to said message-code digits for developing a control signal in that output circuit corresponding to said erroneous message-code digit; a digit-modifying circuit means individually coupled to said output circuits of said error-digit decoding circuit means and to said first pulse-storage means for correcting said erroneous message-code digit; third pulse-storage circuit means individually coupled to said digit-modifying circuit means for storing said corrected message-code digits; and pulse-decoding means responsive to said corrected and stored message-code digits for reproducing said symbols.

10. An error-correcting pulse-code-receiving system for receiving a signal representing message-code pulses representative of discrete message symbols and check-code pulses for checking said signal for signal-translation error and for reproducing said symbols subject to reduced error comprising: code-pulse-supply circuit means for supplying said message-code pulses and said check-code pulses; first pulse-storage circuit means coupled to said supply circuit means for individually storing a predetermined plurality of plural-digit message-code pulse groups individually representative of said symbols and a check-code pulse group uniquely representative of predetermined digital relations in said plurality of message-code groups; message-digit and check-digit scanners individually responsive to predetermined digital combinations of said message-code and check-code pulse groups; odd-even pulse counter means individually coupled to said scanners for developing control signals representing the odd-even sum values of said message-code and check-code pulses of said combinations, said values being jointly representative in code of the digit of any single signal-translation error in said predetermined plurality of message-code groups; second pulse-storage circuit means individually coupled to said counters for storing said control signals; error-digit decoding circuit means coupled to said second pulse-storage means and having a plurality of output circuits individually corresponding to said message-code digits for developing a control signal in that output circuit corresponding to said erroneous message-code digit; digit-modifying circuit means individually coupled to said output circuits of said error-digit decoding circuit means and to said first pulse-storage means for correcting said erroneous message-code digit; third pulse-storage circuit means individually coupled to said digit-modifying circuit means for storing said corrected message-code digits; and automatic-telegraph pulse-decoding means comprising message-digit scanner means coupled to said third pulse-storage means for sequentially deriving therefrom said corrected message-code pulses in groups in a predetermined order and for generating start-stop synchronizing digits for each such group, said pulse-decoding means being responsive to said corrected message-code pulse groups and to said start-stop synchronizing digits for sequentially reproducing said symbols.

11. An error-correcting pulse-code-receiving system for receiving a signal representing message-code pulses representative of discrete message symbols and check-code pulses for checking said signal for signal-translation error and for reproducing said symbols subject to reduced error comprising: code-pulse-supply circuit for supplying said message-code pulses and said check-code pulses and a two-part synchronizing signal, said parts individually comprising pulse groups distinguishable from each other and from said message-code and check-code pulses; pulse-triggered pulse-storage means coupled to said supply circuit means for storing a predetermined plurality of plural-digit message-code pulse groups individually representative of said symbols and a check-code pulse group uniquely representative of predetermined digital relations in said plurality of message-code groups; pulse-triggered error-correcting circuit means responsive jointly to said stored message-code and check-code groups for correcting error in said message-code groups; pulse-decoding means responsive to said corrected message pulses for reproducing said symbols; and synchronizing circuit means comprising a synchronizing-signal recognizer responsive to either part of said synchronizing signal and trigger-pulse generator means coupled to said recognizer for generating pulses for triggering said pulse-storage means in synchronism with the supply of individual digits of said message-code group and for triggering said error-correcting circuit means in synchronism with the supply of said predetermined plurality of message-code groups.

12. An error-correcting pulse-code-receiving system for receiving a signal representing message-code pulses representative of discrete message symbols and check-code pulses for checking said signal for signal-translation error and for reproducing said symbols subject to reduced error comprising: code-pulse-supply circuit means for supplying said message-code pulses and said check-code pulses and a two-part synchronizing signal, said parts individually comprising pulse groups of different nonintegral digital formations distinguishable from each other and from said message-code and check-code pulses; pulse-triggered pulse-storage means coupled to said supply circuit means for deriving therefrom and storing a predetermined plurality of plural-digit message-code pulse groups individually representative of said symbols and a check-code pulse group uniquely representative of predetermined digital relations in said plurality of message-code groups; pulse-triggered error-correcting circuit means responsive jointly to said stored message-code and check-code groups for correcting error in said message-code groups; pulse-decoding means responsive to said corrected message pulses for reproducing said symbols; and synchronizing circuit means comprising a synchronizing-signal recognizer responsive to either part of said synchronizing signal and trigger-pulse generator means coupled to said recognizer for generating pulses for triggering said pulse-storage means in synchronism with the supply of individual digits of said message-code groups and for triggering said error-correcting circuit means in synchronism with the supply of said predetermined plurality of message-code groups.

13. An error-correcting pulse-code-receiving system for receiving a signal representing message-code pulses representative of discrete message symbols and check-code pulses for checking said signal for signal-translation error and for reproducing said symbols subject to reduced error comprising: code-pulse-supply circuit means for supplying said message-code pulses and said check-code pulses and a two-part synchronizing signal, said parts individually comprising pulse groups distinguishable from each other and from said message-code and check-code pulses; pulse-triggered pulse-storage means coupled to said supply circuit means for deriving therefrom and storing a predetermined plurality of plural-digit message-code pulse groups individually representative of said symbols and a check-code pulse group uniquely representative of predetermined digital relations in said plurality of message-code groups; pulse-triggered error-correcting circuit means responsive jointly to said stored message-code and check-code groups for correcting error in said message-code groups; pulse-decoding means comprising a message-digit scanner coupled to said error-correcting circuit means for sequentially developing corrected message pulses in a predetermined order, said pulse-decoding means being responsive to said corrected message pulses for reproducing said symbols; and synchronizing circuit means comprising a synchronizing-signal recognizer responsive to either part of said synchronizing signal and trigger-pulse generator means coupled to said recognizer for generating pulses for triggering said pulse-storage means in synchronism with the supply of individual digits of said message-code groups and for triggering said error-correcting circuit means and said message-digit scanner in synchronism with the supply of said predetermined plurality of message-code groups.

14. An error-correcting pulse-code-receiving system for receiving a signal representing message-code pulses representative of discrete message symbols and check-code pulses for checking said signal for signal-translation error and for reproducing said symbols subject to reduced error comprising: code-pulse-supply circuit means for supplying said message-code pulses and said check-code pulses and a two-part synchronizing signal, said parts individually comprising pulse groups distinguishable from each other and from said message-code and check-code pulses; triggered first pulse-storage means coupled to said supply circuit means for storing a predetermined plurality of plural-digit message-code pulse groups individually representative of said symbols and a check-code pulse group uniquely representative of predetermined digital relations in said plurality of message-code groups; triggered error-correcting circuit means responsive jointly to said stored message-code and check-code groups for correcting error in said message-code groups; triggered pulse-decoding means responsive to said corrected message-code groups for reproducing said symbols; second pulse-storage means coupled to said supply circuit means for storing said synchronizing-pulse groups; a pair of means individually responsive to said stored synchronizing-pulse groups for individually deriving control signals therefrom; and control circuit means responsive to either of said control signals for effectively utilizing the same for triggering said first pulse-storage means, said error-correcting circuit means, and said pulse-decoding means.

15. An error-correcting pulse-code-receiving system for receiving a signal representing message-code pulses representative of discrete message symbols and check-code pulses for checking said signal for signal-translation error and for reproducing said symbols subject to reduced error comprising: code-pulse-supply circuit means for supplying said message-code pulses and said check-code pulses and a two-part synchronizing signal, said parts individually comprising pulse groups distinguishable from each other and from said message-code and check-code pulses; triggered first pulse-storage means coupled to said supply circuit means for storing a predetermined plurality of plural-digit message-code pulse groups individually representative of said symbols and a check-code pulse group uniquely representative of predetermined digital relations in said plurality of message-code groups; triggered error-correcting circuit means responsive jointly to said stored message-code and check-code groups for correcting error in said message-code groups; triggered pulse-decoding means responsive to said corrected message-code groups for reproducing said symbols; tape-recording means coupled to said supply circuit means for storing said synchronizing-pulse groups; means comprising a first group of pick-up devices responsive to the leading and trailing pulse edges of one of said stored synchronizing-pulse groups for deriving a first control signal; means comprising a second group of pick-up devices responsive to the leading and trailing pulse edges of the other of said stored synchronizing-pulse groups for deriving a second control signal; and control circuit means responsive to either of said control signals for effectively utilizing the same for triggering said first pulse-storage means, said error-correcting circuit means, and said pulse-decoding means.

16. An error-correcting pulse-code-receiving system for receiving a signal representing message-code pulses representative of discrete message symbols and check-code pulses for checking said signal for signal-translation error and for reproducing said symbols subject to reduced error comprising: code-pulse-supply circuit means for supplying said message-code pulses and said check-code pulses and a two-part synchronizing signal, said parts individually comprising pulse groups distinguishable from each other and from said message-code and check-code pulses; triggered first pulse-storage means coupled to said supply circuit means for storing a predetermined plurality of plural-digit message-code pulse groups individually representative of said symbols and a check-code pulse group uniquely representative of predetermined digital relations in said plurality of message-code groups; triggered error-correcting circuit means responsive jointly to said stored message-code and check-code groups for correcting error in said message-code groups; triggered pulse-decoding means responsive to said corrected message-code groups for reproducing said symbols; second pulse-storage means coupled to said supply circuit means for storing said synchronizing-pulse groups; a first group of pick-up means responsive to the leading and trailing pulse edges of one of said stored synchronizing-pulse groups and a first group of unidirectionally conductive means individually coupled to said pick-up means and having a common terminal for deriving a control pulse from said one synchronizing-pulse group; a second group of pick-up means responsive to the leading and trailing pulse edges of the other of said stored synchronizing-pulse groups and a second group of unidirectionally conductive means individually coupled to said pick-up means of said second group and having a common terminal for deriving a control pulse from said other synchronizing-pulse group; and control circuit means coupled to said common terminals and responsive to either of said control pulses for effectively utilizing the same for triggering said first pulse-storage means, said error-correcting circuit means, and said pulse decoding means.

17. An error-correcting pulse-code-receiving system for receiving a signal representing message-code pulses representative of discrete message symbols and check-code pulses for checking said signal for signal-translation error and for reproducing said symbols subject to reduced error comprising: code-pulse-supply circuit means for supplying said message-code pulses and said check-code pulses and a two-part synchronizing signal, said parts individually comprising pulse groups distinguishable from each other and from said message-code and check-code pulses; triggered first pulse-storage means coupled to said supply circuit means for storing a predetermined plurality of plural-digit message-code pulse groups individually representative of said symbols and a check-code pulse group uniquely representative of predetermined digital relations in said plurality of message-code groups; triggered error-correcting circuit means responsive jointly to said stored message-code and check-code groups for correcting error in said message-code groups; triggered pulse-decoding means responsive to said corrected message-code groups for reproducing said symbols; second pulse-storage means coupled to said supply circuit for storing said synchronizing-pulse groups; a pair of means individually responsive to said stored synchronizing-pulse groups for individually deriving control signals therefrom; means responsive to predetermined pulses of said groups for deriving a third control signal therefrom; and control circuit means responsive to any of said control signals for effectively utilizing the same for triggering said first pulse-storage means, said error-correcting circuit means, and said pulse-decoding means.

18. An error-correcting pulse-code-receiving system for receiving a signal representing message-code pulses representative of discrete message symbols and check-code pulses for checking said signal for signal-translation error and for reproducing said symbols subject to reduced error comprising: code-pulse-supply circuit means for supplying said message-code pulses and said check-code pulses; error-correcting circuit means responsive jointly to a predetermined plurality of 5-digit message-code pulse groups individually representative of said symbols and a 5-digit check-code pulse group uniquely representative of predetermined digital relations in said plurality of message-code groups for correcting error in said message-code groups; and pulse-decoding means responsive to said corrected message-code groups for reproducing said symbols.

19. An error-correcting pulse-code-receiving system for receiving a signal representing message-code pulses representative of discrete message symbols and check-code pulses for checking the signal for signal-translation error and for reproducing the symbols subject to reduced error comprising: cole-pulse-supply circuit means for supplying the message-code pulses and the check-code pulses; error-correcting circuit means responsive jointly to a predetermined plurality of plural-digit message-code pulse groups individually representative of said symbols and a check-code pulse group of minimum redundancy and uniquely representative of predetermined digital relations in said plurality of message-code groups for indicating which is the erroneous digit and for correcting error in said message-code groups when a single signal-translation error has occurred; and pulse-decoding means responsive to said corrected message-code groups for reproducing said symbols.

References Cited in the file of this patent

UNITED STATES PATENTS

| | | |
|---|---|---|
| RE. 23,601 | Hamming | Dec. 23, 1952 |
| 2,552,629 | Hamming | May 15, 1951 |
| 2,596,199 | Bennett | May 13, 1952 |
| 2,653,996 | Wright | Sept. 29, 1953 |
| 2,689,950 | Bayliss et al. | Sept. 21, 1954 |
| 2,892,888 | James | June 30, 1959 |